United States Patent [19]

Ragen et al.

[11] 4,029,190

[45] June 14, 1977

[54] FONT CONVERSION APPARATUS

[75] Inventors: Robert A. Ragen, Hayward; Carl E. Herendeen, Danville, both of Calif.

[73] Assignee: Xerox Corporation, Stamford, Conn.

[22] Filed: June 28, 1976

[21] Appl. No.: 700,418

[52] U.S. Cl. .............................. 197/1 R; 101/93.05; 340/172.5

[51] Int. Cl.² .......................................... B41J 3/50

[58] Field of Search ................. 197/1 R; 101/93.04, 101/93.05; 340/172.5, 173 R, 173 RC

[56] References Cited

UNITED STATES PATENTS

| | | | |
|---|---|---|---|
| 3,627,096 | 12/1971 | Finnegan | 197/1 R |
| 3,929,214 | 12/1975 | Herbert | 197/1 R |

FOREIGN PATENTS OR APPLICATIONS

| | | | |
|---|---|---|---|
| 2,457,884 | 12/1974 | Germany | 197/1 R |
| 2,452,867 | 11/1974 | Germany | 197/1 R |
| 2,532,383 | 7/1975 | Germany | 197/1 R |

Primary Examiner—E. H. Eickholt
Attorney, Agent, or Firm—M. J. Colitz; T. J. Anderson; B. P. Smith

[57] ABSTRACT

Apparatus for energizing a selected one or more of a plurality of actuation devices in order to cause a printing element associated with each selected actuation device to strike an adjacent recording medium. The apparatus comprises memory means responsive to a predetermined address signal for supplying a plurality of data bits and a conversion bit together identifying those actuation devices selected for energization, a plurality of switches respectively coupled to the plurality of actuation devices, each switch capable of energizing its respective actuation device in response to receipt of a data bit of a first state, means coupled to the memory means and to first and second predetermined ones of the switches and being responsive to the conversion bit being of a first state for supplying a predetermined data bit to the first predetermined switch and responsive to the conversion bit being of a second state for supplying the predetermined data bit to the second predetermined switch, and means coupled to the memory means and to other ones of the switches for respectively supplying other ones of the data bits to such other ones of the switches.

18 Claims, 6 Drawing Figures

FONT CONVERSION APPARATUS

BACKGROUND OF THE INVENTION

This invention relates to apparatus for energizing a selected one or more of a plurality of actuation devices in order to cause a printing element associated with each selected actuation device to strike an adjacent recording medium.

Matrix printing techniques have been known for many years with the most contemporary methods utilizing a matrix print head having a plurality of printing wires arranged in a linear array at a printing end adjacent a recording medium. A character is printed in a dot matrix, wherein the dots of each of a plurality of columns of dots are formed by impacting selected ones of the wires against the adjacent recording medium. An electromagnetic actuating assembly, usually including an armature, at least one pole piece and a coil disposed about the pole piece, is employed to selectively impact each print wire against the recording medium. These types of print heads are well-known, as exemplified in U.S Pat. Nos. 3,627,096 and 3,929,214.

As discussed in U.S. Pat. No. 3,627,096, it is possible to print letters in both upper and lower-case font style by using two additional print wires positioned below the standard seven at the linearly arranged ends of the wires. The additional wires are necessary since there are some lower-case letters, e.g. g and j, which demand an extension below the normal base line of all upper-case letters and most lower-case letters. Accordingly, and as described in the patent, the first through seventh wires only are used in the formation of all upper-case letters, whereas all nine wires are used to form the lower-case letters.

In view of the above, it is heretofore been found necessary to provide a character memory capable of providing a plurality of bits of data for each dot column to be imprinted, wherein the number of data bits at least equals the number of print wires in the print head. In the print head disclosed in U.S. Pat. No. 3,627,096, which has nine wires, the memory must be capable of supplying nine bits of data for each column of dots to be formed. Although 9-wire memories have been used in the past in connection with hard-wired matrix printer control systems, modern-day microprocessor controllers normally utilize 8-bit memory devices, which may require the need for two such devices (16-bit capacity) in order to provide the requisite 9-bit output. Such use of plural 8-bit memories suffers from the disadvantages of being wasteful, costly and prone to timing errors, since all 9-bits for each dot column must normally be supplied simultaneously, thereby requiring the one bit utilized from the second memory to be synchronized with the eight bits supplied from the first memory.

It would be desirable, therefore, to be able to use a single memory device of a predetermined bit-capacity for controlling the actuation of a plurality of print wires, such as those in a matrix print head, in order to print both upper and lower-case letters, wherein the total number of wires may be more than the bit-capacity of the memory.

SUMMARY OF THE INVENTION

In accordance with the invention, apparatus is provided for energizing a selected one or more of a plurality of actuation devices in order to cause a printing element associated with each selected actuation device to strike an adjacent recording medium. The apparatus comprises memory means responsive to a predetermined address signal for supplying a plurality of data bits and a conversion bit together identifying those actuation devices selected for energization, a plurality of switches respectively coupled to the plurality of actuation devices, each switch capable of energizing its respective actuation device in response to receipt of a data bit of a first state, means coupled to the memory means and to first and second predetermined ones of the switches and being responsive to the conversion bit being of a first state for supplying a predetermined data bit to the first predetermined switch and responsive to the conversion bit being of a second state for supplying the predetermined data bit to the second predetermined switch, and means coupled to the memory means and to other ones of the switches for respectively supplying other ones of the data bits to such other ones of the switches.

In accordance with the preferred embodiment, an 8-bit memory is used to supply 7 data bits to selected ones of nine print wires included in a matrix print head. There are nine electromagnetic actuating devices respectively associated with the nine print wires and nine switches for selectively energizing the nine actuating devices. Bit-positions 3–7 of the memory supply data to the switches associated with print wires 3–7 during both upper and lower-case printing. During upper-case printing, bit-positions 1 and 2 of the memory supply data to the switches associated with printing wires 1 and 2, whereas during the lower-case printing of those letters requiring two dot positions below the normal base line, bit-positions 1 and 2 of the memory means supply data to the switches associated with print wires 8 and 9 instead of those associated with print wires 1 and 2. Thus, the lower two data bits 8 and 9 for these lower-case letters are stored at bit-positions 1 and 2 in the memory. The eighth bit from the memory is a conversion bit which, when in a first state, is supplied to associated logic for causing the data bits from bit-positions 1 and 2 to be supplied to the switches associated with print wires 1 and 2, whereas when the eighth bit is in a second state, such logic causes the data bits from bit-positions 1 and 2 to be supplied to the switches associated with print wires 8 and 9.

These and other aspects and advantages of the present invention will be more completely described below with reference to the accompanying drawings.

DESCRIPTION OF THE PREFERRED EMBODIMENT

Figure 1:
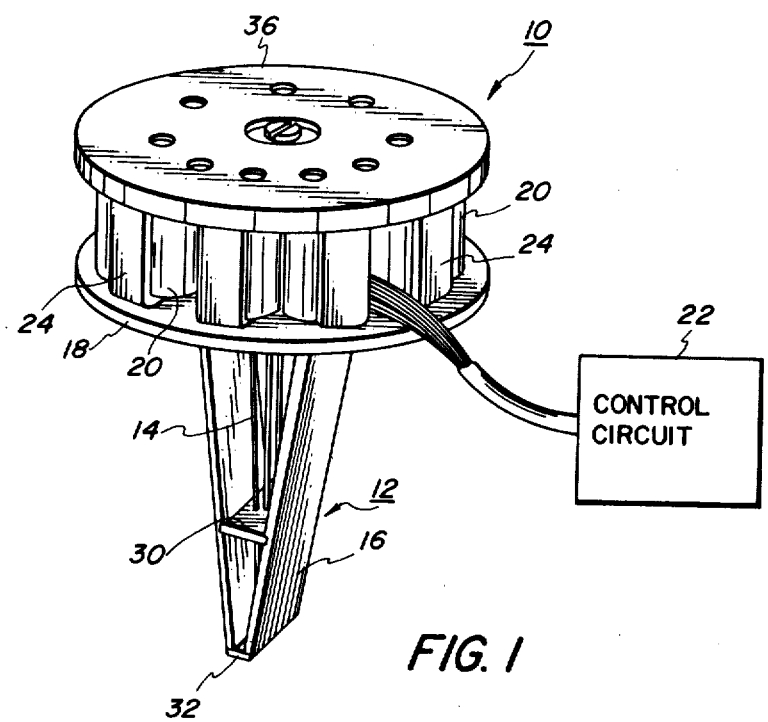
FIG. 1 is a front perspective view of an exemplary matrix print head with which the present invention may be used.

Referring to FIG. 1, an exemplary matrix print head 10 is shown with which the present invention may be used. The print head 10 comprises a wire guide assembly 12 for guiding a plurality (e.g. nine) of impact wires 14 along predefined paths. The guide assembly 12 includes a base plate 16 to which a support plate 18 is affixed by suitable means (not shown). A plurality (e.g. nine) of electromagnetic structures are defined on the support plate 18. Each electromagentic structure includes an inner pole piece (not shown) upstanding from the top surface of the support plate 18 and a coil 20 disposed about the inner pole piece. Each coil 20 is electrically connected to a control circuit 22 incorporating the present invention therein. Generally speaking, the control circuit 22 selectively applies a predetermined current flow through each coil for a purpose to be described below. Each electromagnetic structure also comprises an outer pole piece 24 upstanding from the top surface of the support plate 18 at a location adjacent the the associated coil 20.

The head 10 further comprises a plurality (e.g. nine) armatures (not shown) respectively associated with the plurality of electromagnetic structures. Each armature forms with its associated electromagnetic structure an electromagnetic actuator for transferring electromechanical energy to an associated one of the wires 14. More specifically, when current is applied through each coil 20, a magnetic path is established causing the associated armature to be attracted to the associated inner pole piece. When this occurs, the armature forces an upper end of the wire 14 downwardly causing the wire to be propelled downwardly until a lower printing end thereof (not shown) impacts a record medium (not shown) located adjacent the lower surface 28 of the guide assembly 12.

Each wire 14 follows a generally curvilinear path as it is guided through the guide assembly 12. The guide assembly is so designed such that the upper ends of the wires 14 are arranged in a circular array, whereas the lower printing ends are arranged in a substantially linear array. This is made possible by providing at least two guide members 30 and 32 having hole patterns which progressively constrict the circular array down to the linear array. The guide member 32 desirably includes a conventional ruby bearing plate of the variety commonly employed in matrix print heads of this type.

The head 10 further comprises an armature retainer 36 which has the primary function of maintaining the armatures engaged with their associated outer pole pieces 24. Additionally, the armature retainer also has the function of applying a moment of force to each armature tending to cause the inner end thereof to rotate about its associated outer pole piece 24 in order to normally hold the armature inner end in engagement with a shock absorbing member (not shown) mounted to the underside of the reatiner 36. Further details of the exemplary matrix print head 10 and armature retainer 36 may be obtained through a review of copending U.S. application No. 700,417 filed concurrently herewith in the name of Donald G. Hebert for MATRIX PRINT HEAD WITH IMPROVED ARMATURE RETAINER and assigned to the assignee of the present invention.

Characters are preferably formed by successive columns of dot patterns defining a dot matrix. Preferably, a conventional 9 × 7 matrix is employed, i.e. 9 rows and 7 columns, wherein rows 1-7 are used in the printing of all upper-case letters and those lower-case letters not requiring an extension below the normal base line, as is the case with the letters g and j, for example, and rows 3-9 are used in printing those lower-case letters that do require an extension below the normal base line. In terms of the exemplary print head 10, each dot column is formed by energizing the coil or coils 20 associated with the wire 14 to be impacted against the adjacent record medium. For example, in the upper-case T (FIG. 6), the first column would require only the coil 20 associated with the upper-most wire 14, i.e. wire No. 1, to be energized. The second column would require none of the coils 20 to be energized, and so on.

Figure 2:
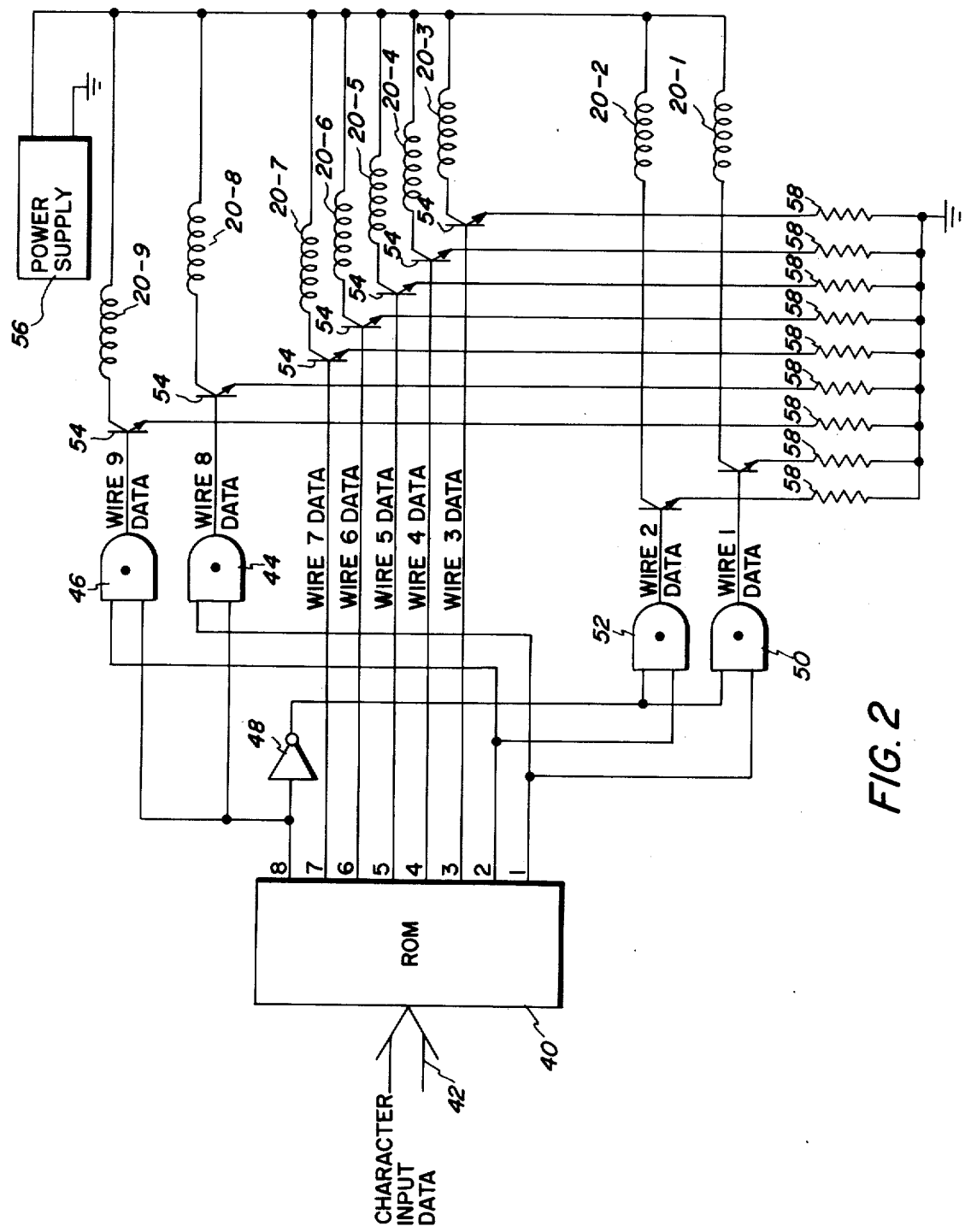
FIG. 2 is a partial schematic diagram of a portion of the control circuit shown in FIG. 1 depicting a presently preferred embodiment of the invention.

Referring now to FIG. 2, and in accordance with the present invention, the control circuit 22 (FIG. 1) includes a multi-bit memory device, such as a conventional 8-bit read-only-memory (ROM) 40. The requisite dot pattern for each column of every character element to be imprinted is stored at a different address location in the ROM. The precise manner in which the dot pattern for each column is stored will be described in more detail below. The ROM 40 is addressed by a character input data address applied thereto on an address bus 42. The address on bus 42 is generally a multibit signal representative of the particular dot column of the particular character to be imprinted.

There are many ways that an address signal of the above-type may be generated. For example, a standard 7-bit ASCII code may be used wherein a unique 7-bit word defines each character. Then, the output of a "count-7" counter may be added to the 7-bit ASCII code to define the address signal. For example, if the ASCII code for a particular character is "001001," a 10-bit address can be used to define each of the seven dot columns of that character, wherein the three most signficant bits would represent the output of the count-7 counter. Thus, the first column could be "0000010011," the second column "0010010011," and so on. Obviously, any other suitable address code capable of addressing a particular column dot pattern for a particular character may be employed.

Now then, when an address signal is applied to the ROM 40 on bus 42, the ROM will generate an 8-bit output word on output lines 1-8. In a presently preferred embodiment, ROM output lines 3-7 supply data bits that are used to selectively energize the coils 20 associated with wire Nos. 3-7 (hereinafter referred to as coils 20-3, 20-4, etc.). This relationship is true regardless of whether a letter to be printed is upper or lower-case. ROM output lines 1 and 2 either supply data bits for selectively energizing the coils 20 associated with wire Nos. 1 and 2, i.e. coils 20-1 and 2-2, when upper-case letters and those lower-case letters not requiring a below normal line extension are to be imprinted, or supply such data bits for selectively energizing the coils 20 associated with wire Nos. 8 and 9, i.e. coils 20-8 and 20-9, when a lower-case character requiring a below normal line extension is to be imprinted.

To this end, the eight bit from the ROM is designated as a conversion bit to indicate whether the data bits supplied on output lines 1 and 2 is for coils 20-1 and 20-2, or for coils 20-8 and 20-9. As shown, the output line 8 from the ROM 40 is coupled to a first input of each of two AND-gates 44 and 46, and is also coupled through an inverter 48 to a first input of each of two other AND-gates 50 and 52. The output lines 1 and 2 from the ROM 40 are respectively coupled to second inputs of the AND-gates 44 and 46, and to respective second inputs of the AND-gates 50 and 52. In this manner, when the eighth bit is true, i.e. binary 1, only the AND-gates 44 and 46 and not AND-gates 50 and 52 will be enabled to pass the data bits respectively supplied thereto from the ROM 40 on output lines 1 and 2. On the other hand, when the eighth bit is false, i.e. binary 0, only the AND-gates 50 and 52 and not AND-gates 44 and 46 will be enabled to pass the data bits respectively supplied thereto on ROM output lines 1 and 2.

As shown in FIG. 2, each coil 20 is coupled between a power supply 56 and the collector electrode of a respective transistor switch 54. Each transistor switch 54 is, in turn, connected at its emitter electrode to ground through a resistor 58. Those transistor switches 54 having their collector electrodes respectively coupled to coils 20-3 through 20-7 have their base electrodes respectively connected to the output lines 3-7 of the ROM 40. Additionally, those transistor switches 54 having their collector electrodes respectively coupled to the coils 20-8 and 20-9 have their base electrodes respectively connected to the outputs of the AND-gates 44 and 46, whereas those transistor switches 54 having their collector electrodes respectively coupled to the coils 20-1 and 20-2 have their base electrodes respectively connected to the outputs of the AND-gates 50 and 52.

Figure 3:
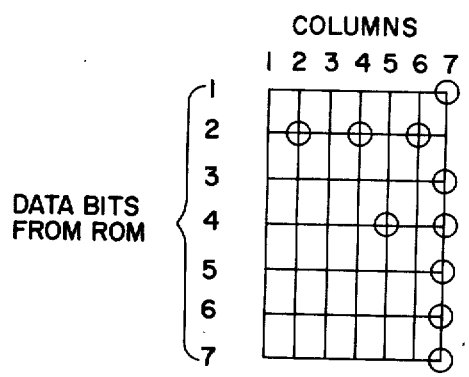
FIG. 3 represents the dot matrix pattern of a lower-case j as stored in and supplied from the ROM shown in FIG. 2.
Figure 5:
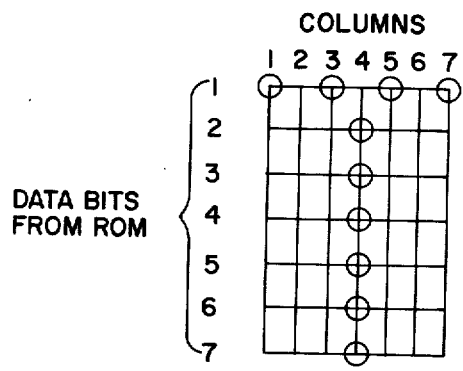
FIG. 5 represents the dot matrix pattern of an an upper-case T as stored in and supplied from the ROM shown in FIG. 2.

Referring now to FIGS. 3 and 5, the manner in which the dot column patterns for a lower-case j, as representative of those lower-case letters requiring an extension beneath the normal base line, and an upper-case T, as representative of the remaining lower-case letters and all upper case letters not requiring such as extension, are supplied from the ROM 40 will be described. Referring first to FIG. 5, ROM output lines 1-7 contain the particular dot pattern for the particular column of the letter T addressed, whereas output line 8 will contain a binary 0 bit enabling only AND-gates 50 and 52, and not AND-gates 44 and 46. Thus, each column of dot data will be respectively delivered along the output lines 3-7 to the base electrodes of the switches 54 associated with coils 20-3 through 20-7, and along the output lines 1 and 2 through gates 50 and 52, respectively, to the base electrodes of the switches 54 associated with coils 20-1 and 20-2.

Figure 4:
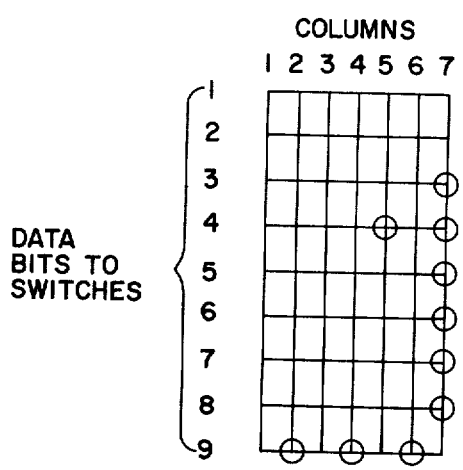
FIG. 4 represents the dot matrix pattern of a lower-case j as applied to the switches shown in FIG. 2.
Figure 6:
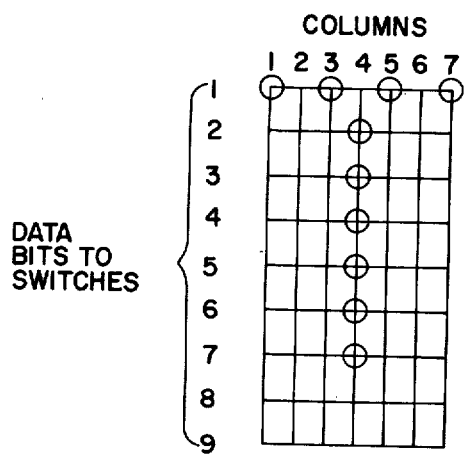
FIG. 6 represents the dot matrix pattern of an upper-case T as applied to the switches shown in FIG. 2.

Thus, for all upper-case letters and those lower-case letters not requiring an extension below the normal base line, energization of the coils 20-1 through 20-7 will bear a direct and respective relationship to the status of the data bits on output lines 1-7 from the ROM 40, as evidenced in FIG. 6. For the lower-case letters requiring a lower extension, as exemplified by the letter j in FIG. 3, the two lowest dot positions, i.e. 8 and 9, of each column are supplied from the ROM 40 on output lines 1 and 2 and then directed through the AND-gates 44 and 46 by providing a binary 1 bit on the output line 8. The data bits supplied on the ROM output lines 1-7 for each column of the letter j are represented in FIG. 3, whereas the data bits applied to the switches 54 associated with the coils 20-3 through 20-9 are represented in FIG. 4.

Each electromagnetic actuating assembly is energized to cause its associated wire 14 to be propelled against an adjacent record medium in the manner above-described by energizing the coil 20 forming part of such actuating assembly for a predetermined period of time. This is done by allowing a predetermined level of current to flow through the coil 20 for such predetermined period of time. The latter is accomplished with respect to any particular coil 20 when the data supplied to the base electrode of the associated switch 54 is true, i.e. binary 1, for the requisite period of time. A true data bit at the base electrode will turn the transistor switch 54 on, allowing current to flow to ground from the power supply 56, through the coil 20, transistor 54 and resistor 58. As soon as the data bit goes false, the transistor will turn off, inhibiting current flow, thereby de-energizing the coil 20 and causing the associated armature to be retracted.

The circuit depicted in FIG. 2 preferably also incorporates a protection circuit of the type disclosed in co-pending U.S. application Ser. No. 700,419 filed concurrently herewith in the name of Fereidoon Matin for HAMMER PROTECTION CIRCUIT and assigned to the assignee of the present invention. This protection circuit has been deleted for purposes of simplicity in emphasizing the unique aspects of the present invention.

Although the present invention has been described with respect to a presently preferred embodiment, it will be appreciated by those skilled in the art that various modifications, substitutions, etc. may be made without departing from the spirit and scope of the invention as defined in and by the following claims. As one example only, the selective shifting of data bits 1 and 2 to dot positions 8 and 9 is merely illustrative, as other shifting schemes could be employed. Thus, data bits 1-7 could all be respectively shifted two positions down to positions 3-9 when it is desired to print lower-case characters requiring a below normal base line extension. In accordance with this scheme, the data bits for dot positions 8 and 9 would be applied on output lines 6 and 7 and not output lines 1 and 2, whereas the data bits for dot positions 3-7 would be applied on output lines 1-5. Suitable logic similar to that depicted in FIG. 2 could be employed to effect such latter shifting.

What is claimed is:

1. Apparatus for energizing a selected one or more of a plurality of actuating devices in order to cause a printing element associated with each selected actuating device to strike on adjacent recording medium, said apparatus comprising:

memory means responsive to a predetermined address signal for supplying a plurality of data bits and a conversion bit together identifying those actuation devices selected for energization;

a plurality of switches respectively coupled to said plurality of actuation devices, each switch capable of energizing its respective actuation device in response to receipt of a data bit of a first state;

first means coupled to said memory means and to first and second predetermined ones of said switches and being responsive to said conversion bit being of a first state for supplying a first predetermined data bit to said first predetermined switch and responsive to said conversion bit being of a second state for supplying said first predetermined data bit to said second predetermined switch; and second means coupled to said memory means and to other ones of said switches for respectively supplying other ones of said data bits to said other ones of said switches.

2. The apparatus of claim 1, further comprising third means coupled to said memory means and to third and fourth predetermined ones of said switches and being responsive to said conversion bit being of a first state for supplying a second predetermined data bit to said third predetermined switch and responsive to said conversion bit being of a second state for supplying said second predetermined data bit to said fourth predetermined switch.

3. The apparatus of claim 1, wherein there are $n$ actuating devices, $n$ printing elements and $n-2$ data bits.

4. The apparatus of claim 1, wherein said first means comprises:
a first gate having one input coupled to said memory means for receiving said conversion bit therefrom, another input coupled to said memory means for receiving said first predetermined data bit therefrom, and an output coupled to said first predetermined switch;
an inverter having an input coupled to said memory means for receiving said conversion bit therefrom and an output; and
a second gate having one input coupled to the output of said inverter, another input coupled to said memory means for receiving said first predetermined data bit therefrom, and an output coupled to said second predetermined switch.

5. The apparatus of claim 4, wherein said first and second gates each comprise an AND-gate.

6. The apparatus of claim 2, wherein said third means comprises:
a first gate having one input coupled to said memory means for receiving said conversion bit therefrom, another input coupled to said memory means for receiving said second predetermined data bit therefrom, and an output coupled to said third predetermined switch;
an inverter having an input coupled to said memory means for receiving said conversion bit therefrom and an output; and
a second gate having one input coupled to the output of said inverter, another input coupled to said memory means for receiving said second predetermined data bit therefrom, and an output coupled to said fourth predetermined switch.

7. The apparatus of claim 6, wherein said first and second gates each comprise an AND-gate.

8. The apparatus of claim 4, further comprising third means coupled to said memory means and to third and fourth predetermined ones of said switches and being responsive to said conversion bit being of a first state for supplying a second predetermined data bit to said third predetermined switch and responsive to said conversion bit being of a second state for supplying said second predetermined data bit to said fourth predetermined switch.

9. The apparatus of claim 8, wherein said third means comprises:
a third gate having one input coupled to said memory means for receiving said conversion bit therefrom, another input coupled to said memory means for receiving said second predetermined data bit therefrom, and an output coupled to said third predetermined switch;
a second inverter having an input coupled to said memory means for receiving said conversion bit therefrom and an output; and
a fourth gate having one input coupled to the output of said second inverter, another input coupled to said memory means for receiving said second predetermined data bit therefrom, and an output coupled to said fourth predetermined switch.

10. The apparatus of claim 9, wherein said first, second, third and fourth gates each comprise an AND-gate.

11. The apparatus of claim 10, wherein there are $n$ actuating devices, $n$ associated printing elements and $n-2$ data bits.

12. Apparatus for energizing a selected one or more of $n$ actuating devices included in a wire matrix print head in order to cause a print wire associated with each selected actuation device to strike an adjacent recording medium, said apparatus comprising:
memory means responsive to a predetermined address for supplying $n-2$ data bits and a conversion bit together identifying those actuation devices selected for energization;
a plurality of switches respectively coupled to said plurality of actuation devices, each switch capable of energizing its respective actuation device in response to receipt of a data bit of a first state;
first means coupled to said memory means and to first and second predetermined ones of said switches and being responsive to said conversion bit being of a first state for supplying a first predetermined data bit to said first predetermined switch and responsive to said conversion bit being of a second state for supplying said first predetermined data bit to said second predetermined switch; and
second means coupled to said memory means and to other ones of said switches for respectively supplying other ones of said data bits to said other ones of said switches.

13. The apparatus of claim 12, further comprising third means coupled to said memory means and to third and fourth predetermined ones of said switches and being responsive to said conversion bit being of a first state for supplying a second predetermined data bit to said third predetermined switch and responsive to said conversion bit being of a second state for supplying said second predetermined data bit to said fourth predetermined switch.

14. The apparatus of claim 13, wherein said matrix print head has nine actuating devices and nine associated print wires, and said memory means includes an 8-bit ROM, said data bits being supplied on output lines 1–7 of said ROM and said conversion bit being supplied to output line 8.

15. The apparatus of claim 14, wherein said first means comprises:
a first AND-gate having one input coupled to the output line 8 of said ROM for receiving said conversion bit therefrom, another input coupled to the output line 1 of said ROM for receiving said first predetermined data bit therefrom, and an output coupled to said first predetermined switch;
an inverter having an input coupled to the output line 8 of said ROM for receiving said conversion bit therefrom and an output; and
a second AND-gate having one input coupled to the output of said inverter, another input coupled to the output line 1 of said ROM for receiving said first predetermined data bit therefrom, and an output coupled to said second predetermined switch.

16. The apparatus of claim 15, wherein said print wires are arranged in a vertical linear array at an end adjacent a record medium to be impacted thereby, said first predetermined switch being coupled to the actuation device associated with the lowest print wire in said vertical linear array, and said second predetermined switch being coupled to the actuation device associated with the next to highest print wire in said vertical linear array.

17. The apparatus of claim 16, wherein said third means comprises:

a third AND-gate having one input coupled to the output line 8 of said ROM for receiving said conversion bit therefrom, another input coupled to the output line 2 of said ROM for receiving said second predetermined data bit therefrom, and an output coupled to said third predetermined switch;

a second inverter having an input coupled to the output line 8 of said ROM for receiving said conversion bit therefrom and an output; and a fourth AND-gate having one input coupled to the output of said second inverter, another input coupled to the output line 2 of said ROM for receiving said second predetermined data bit therefrom, and an output coupled to said fourth predetermined switch.

18. The apparatus of claim 17, wherein said third predetermined switch is coupled to the actuation device associated with the next to lowest print wire in said vertical linear array, and said fourth predetermined switch is coupled to the actuation device associated with the highest print wire in said vertical linear array.

* * * * *